United States Patent Office 3,089,846
Patented May 14, 1963

3,089,846
WELL DRILLING AND FRACTURING FLUIDS
Armin C. Pitchford, Bartlesville, Okla., assignor to Phillips Petroleum Company, a corporation of Delaware
No Drawing. Filed May 23, 1960, Ser. No. 31,221
17 Claims. (Cl. 252—8.5)

This invention relates to drilling and fracturing fluids and to the use of such fluids in well working operations. In another aspect, it relates to drilling fluids or compositions, such as the aqueous and emulsion types, characterized by low fluid-loss and other desirable rheological properties, and to the use of such fluids in drilling oil and gas wells, and other deep wells. In another aspect, it relates to fracturing fluids or compositions having desirably low fluid-loss characteristics, and to the use of such fluids in hydraulically fracturing underground formations or strata of relatively low permeability penetrated by an oil or gas well to increase the productivity of fluids therefrom.

In the art of drilling wells to tap subterranean deposits, such as gas or oil, for example when drilling by the rotary method wherein cuttings must be removed from the bore hole, it is necessary to use a drilling fluid, as is well known to those skilled in the art. The especially prepared drilling fluid is pumped down a hollow drill string or stem within the bore hole, across the drill bit which is attached to the lower end of the drill stem, and is then normally circulated upwardly through the annular space between the drill stem and the bore hole. Circulation of the drilling fluid in this manner removes the cuttings from the bore hole, lubricates and cools the drill bit, seals the wall of the bore hole with a thin, impervious layer of solid material or filter cake, and applies a hydrostatic head to the formation to counter balance formation pressures.

In recent years, various methods have been proposed in the oil industry for increasing or stimulating the productivity of oil or gas wells by enlarging the flow or drainage pattern within a selected oil- or gas-producing formation of relatively low permeability. Emphasis has been placed on hydraulically fracturing such formations with various liquids, such as native crude oil, lease crude oil, diesel fuel, kerosene, etc., with or without propping agents, such as sand, suspended therein. These liquids are pumped in a well adjacent the formation to be fractured and sufficient pressure applied to the body of liquid in the well. The hydraulic pressure applied to such low permeable formations creates tensile stresses in the rock of the formation surrounding the well bore and these stresses cause splitting, parting, or fracturing of the rock, the pressure required to part or fracture a formation in a well being termed "formation breakdown pressure." The initially formed fractures or channels are then extended by the injection of hydraulic liquid therein, the propping agent being deposited in the fractures to maintain the permeability of the formation during subsequent production thereof.

One of the most important rheological characteristics of well drilling fluids used in well drilling operations is that of fluid-loss or liquid-loss. In both drilling and fracturing operations the well working fluids should exhibit a low rate of filtration or fluid-loss, that is, the fluids should permit little if any loss of their liquid phase to the formation contacted, penetrated, or fractured. In the case of drilling fluids, loss of the liquid phase to the formation results in an upset of the balanced rheological properties, loss of valuable treating chemicals, damage to the formation, as well as an increase in the expense of drilling the well. In the case of fracturing fluids, loss of the liquid phase to the fractures created impairs extension of such fractures and the deposition of propping agents therein, the ratio of propping agent to fracturing liquid in the fracture increasing above that desired and often giving rise to sand-outs.

While many fluid-loss control additives for well working fluids have been proposed, patented, or used, many of these additives have one or more properties which restrict their field of application.

Accordingly, an object of this invention is to provide a well working composition or fluid having low fluid-loss properties and other desirable rheological characteristics, such compositions having extensive application in well working operations. Another object is to provide an improved method of treating a well with such well working composition. Another object is to provide an improved method of treating a well working composition to improve its fluid-loss characteristics. Another object is to provide improved drilling fluids or compositions, such as the aqueous and emulsion types, characterized by low fluid-loss and other desirable rheological properties, and to provide an improved method of drilling oil and gas wells, and other deep wells, through the use of such fluids. Another object is to provide improved fracturing fluids or compositions having desirably low fluid-loss characteristics, and to provide an improved method of hydraulically fracturing underground formations or strata of relatively low permeability through the use of such improved compositions so as to increase the productivity of fluids from such formations. Other objects and advantages of this invention will become apparent to those skilled in the art from the following discussion and appended claims.

Briefly stated, the above objects of the present invention are achieved by treating well working fluids with asphaltene carboxylic acids or salts thereof to improve the fluid-loss properties and other rheological characteristics thereof, and conducting well working operations, such as drilling and fracturing, with such compositions. The fluid-loss additives used in this invention can best be prepared by treating asphaltenes with nitric acid to produce asphaltene carboxylic acids and then, if desired, neutralizing these acids to form the corresponding salts.

The terms "asphalt" or "asphaltic material" as used in this specification and in the appended claims are meant to cover dark brown to black liquid, semi-solid or solid cementitious mixtures of hydrocarbons of natural or pyrogenous origin, or a combination of both, which are completely or substantially soluble in carbon disulfide, and wherein bitumens are the sole or predominate constituent. Naturally occurring or native asphalts and pyrogenous asphalts useful in the practice of this invention include materials such as albertite, elaterite, gilsonite, grahamite, wurtzilite, Trinidad or Bermudez Lake asphalts, and those asphalts obtained by refining petroleum by distillation, precipitation, cracking, solvent extraction, or similar operations, for example, distillation residues, still bottoms, cracked residues, straight-run residues, asphaltic bitumens, blown asphalt, and the like.

The term "asphaltenes" as used in this specification and in the appended claims is meant to cover those constituents of asphalt which are soluble in carbon disulfide but insoluble in paraffin naphthas, n-pentane, n-hexane, n-heptane, petroleum ether, cyclopentane, and like light hydrocarbons, this asphaltic constituent having relatively high molecular weights (e.g., $10^3$–$10^5$) and a predominantly aromatic character.

The term "asphaltene carboxylic acids" as used in this specification and in the appended claims is meant to cover the acidic products produced by oxidation of the corresponding asphaltene precursor, such as by treating asphaltenes with nitric acid according to this invention, these acidic products being water insoluble and capable of being converted upon neutralization, for example with caustic, to the corresponding water dispersible or soluble salts.

Asphalts having ring and ball softening points in the range of 60 to 350° F. are generally applicable in preparing the asphaltene carboxylic acids, those having softening points in the range of 100 to 250° F. being even more preferred.

Especially useful asphaltic materials are those obtained from asphaltic crude oils, the residua products thereof having from 3 to 60 weight percent, preferably 15 to 25 weight percent, asphaltenes. Petroleum residuum which I have found to be particularly useful as starting material is that obtained by desalting, topping, and vacuum reducing Wafra crude oil, which residuum can be characterized as a 1025° F. residuum. Typical apshaltic starting materials will generally comprise 10 to 40 weight percent asphaltenes, 15 to 75 weight percent asphaltic resins, and 20 to 70 weight percent oily constituents.

The asphaltene constituent can be obtained from the asphalt by treating the latter so as to precipitate the asphaltene constituents, using for this purpose a paraffin liquid hydrocarbon such as n-pentane, n-hexane, n-heptane, octane, petroleum ether, petroleum naphthas, cyclopentane and the like, preferably a normal paraffin hydrocarbon having a total of 5 to 8 carbon atoms per molecule. This separation of the asphaltene constituent is essentially a solvent extraction step, resulting in the precipitation or flocculation of the insoluble, solid asphaltenes, the asphaltic resins and oily constituents being soluble in the paraffinic solvent. The ratio of solvent/asphalt can vary over a wide range, generally 5/1 to 100/1 and preferably about 10/1, the particular ratio used depending upon the nature of the asphalt, the particular solvent, and conditions of treatment. Temperatures during extraction will also vary and ambient temperatures as well as elevated temperatures can be used, e.g., up to 415° F. and preferably up to 350° F. The resulting insoluble asphaltenes can be separated from the solvent and other soluble asphaltic material by decantation, filtration, and the like, the insoluble asphaltenes settling in one or two hours or after a number of days. The settling rate can be accelerated by applying a pressure, e.g., 375 p.s.i. at 350° F.

The insoluble asphaltenes can be dried and comminuted, or dispersed or slurried in a suitable, non-oxidizable diluent such as water, paraffins such as pentane, hexane, heptane, octane, etc., and commercially available highly branched paraffins, such as Soltrols, sold by the Phillips Chemical Company. Generally, the asphaltenes will have specific gravities (60/60° F.) in the range of 1.1 to 1.3, preferably 1.15 to 1.2.

The asphaltene starting material can be passed in comminuted form or as a dispersion in a suitable inert diluent to a suitable oxidation zone, such as a stirred reactor, where the asphaltenes are oxidized with nitric acid. The reactor can be externally heated or cooled by means of a suitable heat exchange medium, the reaction temperature depending among other things on the concentration of the nitric acid used. The conditions used are favorable to the production of asphaltene carboxylic acids, and a minimum, if any, of nitrated products are produced.

The nitric acid used in this oxidative process will generally have a concentration of from 10 to 70 weight percent, preferably 50 to 60 weight percent. The nitric acid/asphaltenes ratio can vary over a wide range, but generally will be in the range of from 1/2 to 10/1, on an anhydrous basis. Temperatures during treatment will also vary over a wide range, the particular temperature depending on the concentration and amount of nitric acid, the pressure employed (which can be atmospheric or super-atmospheric), the nature of the asphaltenes, and other factors. Generally elevated temperatures will be used in the range of 150° to 350° F., preferably 200° to 250° F. The oxidation reaction period will also vary, and generally will be in the range of from 3 to 30 hours, preferably 5 to 10 hours. The temperature of the oxidation reaction can be controlled by the serial addition of the nitric acid and also by circulating a cooling or heating medium in the external jacket surrounding the oxidation reactor. The reaction mass is continuously agitated by means of a paddle or the like, and the bottoms of the reactor preferably are continuously withdrawn and recycled to the top of the reaction zone to insure complete and quick oxidation. During the reaction, volatile gases, such as nitrogen oxide, and byproducts such as low molecular weight aliphatic monocarboxylic acids, e.g., those having 1–5 carbon atoms per molecule such as formic, acetic, butyric, propionic, valeric, etc., are produced and they can be vented from the reactor. If desired the reaction can be stopped by the addition of water. The oxides of nitrogen which are produced can be collected and introduced again into the reactor to obtain full use of their oxidative properties.

The resulting effluent of insoluble asphaltene carboxylic acids and soluble, low molecular weight acids will generally have the nature of a slurry, depending on the nature of the asphaltenes, the degree of oxidation, etc. The oxidation effluent can be subjected to suitable separation procedures to recover the insoluble asphaltene carboxylic acids for use as such, or the oxidation effluent can be directly neutralized with a basic neutralizing agent. Alternatively, the oxidation reaction mixture can be first preliminarily filtered by means of filtration or the like and the filtered solid, water insoluble asphaltene carboxylic acids washed and neutralized, and the resulting neutralized mixture subjected to further filtration to separate the resulting water soluble asphaltene carboxylic acid solids from the insoluble material which can comprise unreacted asphaltenes, coke and other insolubles.

The carboxylic acids produced by the oxidation treatment of asphaltenes can be neutralized with any basic neutralizing agent such as anhydrous or aqueous ammonia, or an aqueous slurry or solution of a metal salt, oxide, or hydroxide, or amines. Amines which can be used for neutralizing include primary amines having 1–20 carbon atoms such as methylamine through heptadecylamine, secondary amines having 3–30 carbon atoms such as trimethylenediamine, hexylmethylenediamine, etc. Particularly useful commercially available diamines which can be used include those having the formula

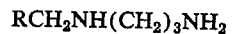

such as Diam 21D (distilled N-coco 1,3-propylene diamine, sold by General Mills Company). I prefer to use as the basic neutralizing agent an akali metal or alkaline earth metal salt, oxide, or hydroxide, thereby converting the resulting asphaltene carboxylic acids to the corresponding alkali metal or alkaline earth metal salts. Metals which are particularly suitable include the alkali metals such as sodium and potassium and the alkaline earth metals such as magnesium, calcium, barium, and the like. The preferred neutralizing agent is an aqueous caustic solution, for example aqueous sodium hydroxide having a concentration of from 10 to 50 weight percent, preferably about 33 weight percent. The neutralizing agent can be added to the oxidation reactor when the oxidation is completed, or the oxidation reaction mixture can be passed to a suitable holding vessel and neutralized there with the neutralizing agent. The oxidation reaction mixture is preferably neutralized to a pH of about 7 to 10, a slight excess of the neutralizing agent being preferred for this purpose. The neutralizing step can be carried out over a wide temperature range, and generally will be in the range of 200 to 240° F. Repeated amounts of the neutralizing agent can be added so as to insure complete neutraliziation. It is also within the scope of this invention to use a combination of neutralizing agents, for example, the asphaltene carboxylic acids can be first neutralized with anhydrous ammonia and then with sodium hydroxide, or first sodium hydroxide and then anhydrous ammonia. After neutralization, the pH of the neutralized mixture can be adjusted. The neutralized mixture can be allowed to settle and then separated, for example by decantation, centrifugation, filtration, or the like, to separate the carboxylic acid salts from any sludge or other unreacted material that may be present.

Following neutralization, the recovered water soluble asphaltene carboxylic acid salts can be dried, for example by flashing or by use of a suitable drum drier, and the dry product crushed or otherwise comminuted. The neutralized product will generally have a brown to dark black color and will have a friable consistency, and it will also be relatively neutral.

In the drilling fluids prepared according to this invention, the asphaltene carboxylic acid products are dispersed in either the aqueous or oil phase. As mentioned hereinbefore, the drilling fluids prepared according to this invention and containing the aforementioned asphaltene carboxylic acid product, have desirable rheological properties, notably viscosity and fluid loss, which are not adversely affected by the presence of soluble metal ions, primarily polyvalent metal ions such as calcium, derived from gypsum formations, salt deposits, or cement. Furthermore, the drilling fluids of this invention are capable of taking up a considerable proportion of the finely divided bit cuttings or drilled solids without adverse effect on the properties of the drilling fluids.

The drilling fluids of this invention can be prepared by any conventional method. The amount of asphaltene carboxylic acid product, water, and oil employed are dependent upon several variables, such as the nature of the asphaltene carboxylic acid product itself, the density of the drilling fluid desired, the nature of the formation penetrated, and other factors that can be readily determined by those skilled in the art upon being acquainted with this invention. It has long been customary in rotary well drilling operations to subject the drilling fluid to simple routine tests from time to time, and these tests are sufficient to indicate the relative amounts of asphaltene carboxylic acid product, water, or oil to be employed. Generally, the amount of asphaltene carboxylic acid product employed will be sufficient to form a relatively thin, impervious filter cake on the wall of the well, and in an amount that will impart a sufficiently low viscosity to the drilling mud in order that it may readily be pumped and circulated. In general, the amount of asphaltene carboxylic acid product added to the drilling fluid will be in the range from about 0.1 to about 10 pounds per barrel (42 U.S. gallons) of drilling fluid.

For water-in-oil emulsion systems, the amount of water to be employed would generally range from as low as 1 percent by weight of the final drilling fluid to 60 percent by weight, and preferably less than 40 percent by weight. For oil-in-water emulsion systems, the amount of water will be in the range from about between 99 to 60 percent by weight of the final emulsion and the amount of oil will be in the range from 1 to 40 percent by weight of the final emulsion.

The oil component used in preparing the oil-base and emulsion drilling fluids of this invention can be any hydrocarbon normally used for this purpose in the art, such as Diesel fuel, crude oil, kerosene, gas oil, heavy fuel oil, various petroleum fractions, and the like.

Although the drilling fluids of this invention need only contain the water-dispersible and oil-dispersible asphaltene carboxylic acid product as the material necessary to obtain desirable rheological properties, especially low fluid loss, it is within the scope of this invention to add clays or other finely divided inorganic solids. In addition, materials commonly used for weighting purposes can be added, including finely divided limestone, barite, lead sulfide, oyster shell, or the like. For emulsion systems any suitable conventional emulsifying agent, such as the alkaline earth metal salts of saponifiable oils such as vegetable oils, wood oils, fish oils and the like, can be employed. Other applicable emulsifying agents include dresinates, alkali and alkaline earth salts of lignin, alkali metal salts of carboxy methyl cellulose, and the like. In general, the emulsion drilling fluids prepared according to this invention are relatively stable type emulsions.

The amount of asphaltene carboxylic acid product added to the hydraulic fracturing liquid will vary, and be dependent upon several variables, such as the nature of the asphaltene carboxylic acid product itself, the density of the fracturing fluid desired, the nature of the formation penetrated, the type of carrier or vehicle used, and other factors that can be readily determined by those skilled in the art by means of simple, well-known routine tests. Generally, the amount of asphaltene carboxylic acid product employed, stated functionally, will be that amount sufficient to reduce the fluid-loss of the fracturing liquid, without rendering the fracturing liquid too viscous to be pumped or circulated. Stated another way, the amount of additive used is that sufficient to retard the tendency of the fracturing liquid to filter into the permeable formation treated. For most applications, the amount of asphaltene carboxylic acid product added to the fracturing liquids of this invention will be in the range of about 0.1 to about 10 pounds per barrel (42 U.S. gallons) of fracturing liquid, although amounts lesser or greater (e.g., up to 30 pounds per barrel) than this range can be employed.

The fracturing liquids of this invention can be prepared by using any of the conventional proportioning and mixing techniques now used in the art. For example, the asphaltene carboxylic acid product can be added to the carrier as a dry material through a proportioner hopper, or as a concentrate in the form of a concentrated dispersion of the asphaltene carboxylic acid product in a small amount of the carrier, or by any means of chemical metering pumps, etc.

Any of those underground formations or strata known to be fracturable can be fractured using the novel fracturing liquid of the subject invention, such as consolidated sandstones, limestones, dolomites, granite washes, hard or brittle shale, conglomerates, and the like, such formations generally having a permeability in the range of 0.1 to 200 millidarcies. Formations having existing fractures, or initial fractures created by previous fracturing operations, can be extended and the productivity of the formation increased by using the fracturing fluid of this invention to extend such fractures.

The well treated with the fracturing liquids of this invention can be provided with the usual wellhead pressure connections and fittings, such as blow-out preventors, pressure gauges, etc. The hydraulic fracturing liquid of this invention can be pumped directly down the well casing or down through tubing depending within the casing. The particular formation to be fractured can be isolated by means of suitable packers or the like. The usual pump trucks can be used to pump the hydraulic fracturing liquid down through either the casing or tubing, or both. Prior to the actual fracturing operation, the well bore can be cleaned with any suitable cleaning liquid such as dilute acid, lease crude, any of the carriers used to prepare the fracturing liquid, or the fracturing liquid itself.

The initial fractures can be produced with lease crude, or any other suitable liquid such as those employed as carriers in the fracturing liquids of this invention, or even the fracturing liquid of the subject invention; these liquids can be generically termed "formation breakdown fluids." After fractures have been initiated, the fracturing liquid of this invention, preferably loaded with the propping agent, is then pumped into the initially-formed fractures under high pressure to extend the same. Where fracturing is to take place through a casing, the casing can be perforated by conventional means, such as with a perforating gun lowered into the well by means of a wire line to provide one or more perforations adjacent the formation to be fractured. Where the fracturing operation is carried out in open-hole, perforating operations are generally not necessary. The formation breakdown pressure will generally be less than or equal to the overburden pressure, therefore most formations will be fractured with pressures from about 0.6 to 1.0 p.s.i. per foot of depth of the selected portion of the formation, e.g., from 500 to 3500 p.s.i. When the formation breakdown pressure is reached, the formation of initial fractures will be indicated by a pressure drop at the surface. The hydraulic fracturing liquid of this invention can then be pumped into the well and into the initially-formed fractures, the suspended sand being deposited in the extended fractures. The low-penetrating fracturing liquid of this invention will have a retarded tendency to filter into the permeable surfaces or walls of the growing fractures and be lost thereto. Because of the low fluid-loss of these fracturing liquids, it is not necessary to use large pumps and increase the rate of injection in order to inject the liquid faster than it filters into the formation, and because of this low fluid-loss much less fracturing liquid will be required to fracture a formation. At the end of the fracture treatment, pressure is released and the fracturing liquid allowed to continually leak off into the formation until the walls of the fractures close down upon the deposited propping material which holds the fractures fully or partially open, thereby maintaining the increased permeability of the formation. The fracturing fluid can then be removed from the wall by producing the same. As a result of the fractured treatment, the flow or drainage pattern of the formation is enlarged and the productivity of the well is increased. The extension length or width of the fractures will depend upon the volume of fracturing fluid injected, the volume of fracturing fluid retained in the fractures, and the geometry of the fracture. Such fractures will be oriented in horizontal planes, vertical planes or slightly inclined planes, depending upon the viscosity of the fracturing fluid and the formation stresses and tensile strength of the formation. The formation can be successively fractured by additional fracture treatment in the same or different selected portions of the well.

The following example is set forth to further illustrate the objects and advantages of this invention; however, it should be understood that the various ingredients, amounts of ingredients, and other conditions, should not be construed so as to unduly limit this invention.

EXAMPLE I

In this example there is described the preparation of suitable asphaltene starting material which can be used to prepare the novel compositions of matter of this invention.

A Wafra crude oil was desalted, topped, and vacuum reduced to yield a 1025° F.+ residuum having the properties set forth in Table I.

*Table I*

| | |
|---|---|
| Volume percent of crude | 33.0 |
| Weight percent of crude | 37.0 |
| Specific gravity, 60/60° F | 1.0158 |
| API gravity, 60/60° F | 7.8 |
| Viscosity, S.f.s., 210° F | 433 |
| Penetration, 100/5/77° F., mm./10 | 430 |
| Softening point, R. & B., ° F | 93 |
| Asphaltenes (pentane insolubles), wt. percent | 14.46 |

Asphaltenes were separated from the above-described Wafra 1025° F.+ in a series of batch precipitations wherein a plurality of 4-gallon charges of the residuum were solubilized by adding about an equivalent volume of commercial grade n-pentane. After mixing the asphaltic residuum with the solvent, and allowing the mixture to settle, the n-pentane solubles were decanted and filtered without disturbing the settled asphaltenes. The asphaltenes were then slurried with more pentane, filtered, reslurried, and washed with additional portions of solvent, the first washings being added to the original filtrate of pentane solubles. The filtered asphaltenes from each of the batch separations were combined and dried in an oven at 180° F. to yield a dry asphaltene product. Conditions and results of extraction are summarized in Table II. This asphaltene product was used in Example II.

*Table II*

| | |
|---|---|
| Weight of asphalt, lbs | 375.39 |
| Volume of asphalt, gals | 44.43 |
| Volume of n-pentane, gals | 444.2 |
| Solvent/asphalt, ratio | 10/1 |
| Temperature of extraction, ° F | 78–93 |
| Settling time, hrs | 16–72 |
| Asphaltenes yield, lbs | 54.69 |
| Asphaltenes yield, wt. percent | 14.5 |

EXAMPLE II

In this example, a number of runs were made by oxidizing asphaltenes with 15 percent nitric acid in a stirred reactor. Following the oxidative treatment of the asphaltenes, the reaction mass in each run was filtered to obtain a solid acid residue comprising water insoluble asphaltene carboxylic acids (plus unreacted material and some coke) and a filtrate comprising water soluble volatile acids comprising low molecular weight monocarboxylic acids, e.g., 1 to 5 carbon atoms (formic acid through valeric acid). Portions of the solid acid residues from each run were titrated with a standard base (aqueous sodium hydroxide), the neutralized mixtures filtered to obtain the corresponding water soluble sodium salt of the asphaltene carboxylic acid, and an insoluble residue comprising water insoluble unreacted material and coke. Conditions of oxidation and results of these runs are summarized in Table III.

Table III

| | Runs | | | | | | | | | |
|---|---|---|---|---|---|---|---|---|---|---|
| | 1 | 2 | 3 | 4 | 5 | 6 | 7 | 8 | 9 | 10 |
| Asphaltenes, gms | 25 | 25 | 25 | 25 | 25 | 25 | 25 | 25 | 25 | 25 |
| Nitric acid/asphaltenes ratio | 7.5 | 3.1 | 1.5 | 1.7 | 1.7 | 1.7 | 1.6 | 1.8 | 1.8 | 0.94 |
| Nickel naphthenate [a], wt. percent | 0 | 0 | 0 | 1.0 | 5.0 | 10.0 | 5 | 5 | 5 | 0 |
| Oxidation time, hrs | 5 | 5 | 5 | 5 | 5 | 5 | 10 | 15 | 20 | 6.5 |
| Temperature, °F | 230 | 220 | 214 | 214 | 214 | 214 | 214 | 213 | 213 | 210 |
| Nitric acid consumed, gms | 93.5 | 20.4 | 14.2 | 10.0 | | 30.9 | 14.5 | 18.7 | 21.3 | 8 |
| Yields, wt. percent: | | | | | | | | | | |
|   Solid acids [b] | 108.8 | 116.8 | 106.8 | 108.0 | 104.4 | 116.8 | 87.5 | 110.8 | 112.4 | |
|   Volatile acids [c] | 32.0 | 28.0 | 36.0 | 12 | 32 | 40 | 35 | 24 | 28 | 20 |
| Conversion, wt. percent: | | | | | | | | | | |
|   (1) based on solubility of solid acid in methyl ethyl ketone | 99.7 | 45.5 | 15.5 | 21.2 | 25.5 | 28.4 | 25.1 | 35.0 | 30.7 | |
|   (2) based on solubility of water insoluble unreacted material and coke in benzene | 84.7 | 76.0 | 38.9 | 48.5 | 47.8 | 48.8 | 65.4 | 71.1 | 75.4 | |

[a] Used as oxidation catalyst, wt. percent based on asphaltenes.
[b] Comprises water insoluble material obtained on filtering reaction mass.
[c] Comprises water soluble material obtained on filtering reaction mass.

The data of Table III show that best yields and conversions are obtained with higher nitric acid/asphaltenes ratios, e.g., 7.5, and that such results can be obtained without an oxidation catalyst.

EXAMPLE III

In this example, 300 grams of the asphaltenes prepared according to Example I were reacted with 1050 ml. of 50 percent nitric acid, the nitric acid/asphaltenes ratio being 3/1. The mixture was refluxed for 6.5 hours at 220° to 240° F., heated for one hour at 225° F., filtered hot and washed with water. The residue was then reacted with an additional 1400 ml. of 50 percent nitric acid, refluxed for one hour, heated for two hours at 150° to 175° F., refluxed for four hours, cooled to 150° F. and filtered. Filtration yielded a solid reaction product and a filtrate. The latter was made alkaline with sodium hydroxide to prevent volatization of low molecular weight acids; the odor of butyric acid was very predominant. The filtered insoluble residue was washed with about 3 liters of water until the washings were essentially clear, though still acid to pH paper. The residue was dried in an oven and amounted to about 331 grams.

The resulting asphaltene carboxylic acid product was then subjected to various analytical procedures to determine the nature and composition of the same. Elemental analysis of this product is summarized in Table IV.

Table IV

| | Wt. percent |
|---|---|
| Carbon | 57.0 |
| Hydrogen | 4.2 |
| Oxygen (by difference) | 30.0 |
| Nitrogen | 3.1 |
| Sulfur | 5.7 |

Titration of the above-mentioned asphaltene carboxylic acid product according to ASTM Procedure D 664–49 resulted in a total acid number of 202 mg. KOH per gram, this value as well as the titration curve indicating that the product comprises predominantly carboxylic acids.

Characterization of the above-mentioned asphaltene carboxylic acid product according to "The Systematic Identification of Organic Compounds" by R. L. Shriner and R. C. Fuson, third edition, Wiley and Sons, Inc., New York, 1948, showed that the product belongs in class $A_1$, this class comprising acids and negatively substituted phenols.

Analysis of the above-mentioned asphaltene carboxylic acid product by means of an infra-red spectra qualitatively indicated the presence of both —COOH and —$NO_2$.

The above analytical results show conclusively that the products produced by the oxidative treatment of asphaltenes according to this invention are carboxylic acids, with a minimum, if any, of nitration products.

EXAMPLE IV

Several different well working fluids were prepared containing varying amounts of the asphaltene carboxylic acid product prepared according to Example III. The fluid-loss properties of these well working fluids were determined according to API Code No. 29. Results are tabulated in Table V.

Table V

| | Well working compositions | | | | | |
|---|---|---|---|---|---|---|
| | 1 | 2 | 3 | 4 | 5 | 6 |
| Asphaltene carboxylic acid product, gm | 0 | 0 | 20 | 20 | 20 | 20 |
| Water, ml | 350 | 350 | 350 | 350 | 350 | 350 |
| No. 2 Diesel fuel, ml | 0 | 15 | 0 | 5 | 10 | 15 |
| McCracken clay, gm | 37.2 | 37.2 | 37.2 | 37.2 | 37.2 | 37.2 |
| Fluid loss (in 30 min.), ml | 99 | 80 | 5.3 | 4.2 | 3.5 | 3.2 |

The data of Table V show the well working compositions of this invention have very desirable fluid-loss properties.

Various modifications and alterations of this invention will become apparent to those skilled in the art from the foregoing discussions, and it should be apparent that the subject invention is not to be unduly limited to that set forth hereinbefore for illustrative purposes.

I claim:

1. A well working composition comprising a fluid medium selected from the group consisting of water, oil, and an emulsion of water and oil, and an amount of asphaltene carboxylic acids dispersed therein sufficient to reduce the fluid loss of said composition, said asphaltene carboxylic acids prepared by reacting asphaltenes having molecular weights in the range of $10^3$ to $10^5$ with nitric acid.

2. A well working composition comprising a fluid medium selected from the group consisting of water, oil, and an emulsion of water and oil, and the carboxylic acids of asphaltenes in an amount of 0.1 to 10 pounds per barrel of said composition, said asphaltenes having molecular weights in the range of about $10^3$ to $10^5$.

3. A well working composition comprising a fluid medium selected from the group consisting of water, oil, and an emulsion of water and oil, and an additive selected from the group consisting of asphaltene carboxylic acid and the neutralized salts thereof in an amount sufficient to reduce the fluid loss of said composition, said asphaltene carboxylic acids prepared by reacting asphaltenes having molecular weights in the range of $10^3$ to $10^5$ with nitric acid, and said neutralized salts prepared by neutralizing the resulting asphaltene carboxylic acids with a basic neutralizing agent selected from the group consisting of primary amines, secondary amines, diamines, alkali metal oxides, alkali metal hydroxides, alkaline earth metal salts, alkaline earth metal oxides, and alkaline earth metal hydroxides.

4. A well drilling fluid comprising a fluid medium selected from the group consisting of water, oil, and an emulsion of water and oil, and an additive selected from the group consisting of asphaltene carboxylic acids and the neutralized salts thereof in an amount sufficient to reduce the fluid loss of said composition, said asphaltene carboxylic acids prepared by reacting asphaltenes having molecular weights in the range of $10^3$ to $10^5$ with nitric acid, and said neutralized salts prepared by neutralizing the resulting asphaltene carboxylic acids with a basic neutralizing agent selected from the group consisting of primary amines, secondary amines, diamines, alkali metal oxides, alkali metal hydroxides, alkaline earth metal salts, alkaline earth metal oxides, and alkaline earth metal hydroxides.

5. A well drilling fluid according to claim 4 wherein said fluid medium comprises water.

6. A well drilling fluid according to claim 4 wherein said fluid medium comprises oil.

7. A well drilling fluid according to claim 4 wherein said fluid medium comprises an emulsion of water in oil.

8. A well drilling fluid according to claim 4 wherein said fluid medium comprises an emulsion of oil in water.

9. A well working fluid comprising water, clayey material, and the sodium salt of carboxylic acids of asphaltenes, said asphaltenes having molecular weights in the range of $10^3$ to $10^5$, and said sodium salt being present in an amount sufficient to reduce the fluid loss of said drilling fluid.

10. A well drilling fluid according to claim 9 wherein said sodium salt is prepared by reacting asphaltenes with nitric acid and neutralizing the resulting asphaltene carboxylic acids with sodium hydroxide.

11. A well fracturing fluid comprising a liquid carrier selected from the group consisting of oil and water containing asphaltene carboxylic acids in an amount sufficient to reduce the fluid-loss thereof, said asphaltene carboxylic acids prepared by reacting asphaltenes having molecular weights in the range of $10^3$ to $10^5$ with nitric acid.

12. A well fracturing fluid according to claim 11 wherein said liquid carrier comprises a petroleum oil.

13. A well fracturing fluid according to claim 11 wherein said liquid carrier comprises water.

14. A well fracturing composition comprising a petroleum oil carrier and an additive selected from the group consisting of asphaltene carboxylic acids and the neutralized salts thereof in an amount sufficient to reduce the fluid loss of said composition, said asphaltene carboxylic acids prepared by reacting asphaltenes having molecular weights in the range of $10^3$ to $10^5$ with nitric acid, and said neutralized salts prepared by neutralizing the resulting asphaltene carboxylic acids with a basic neutralizing agent selected from the group consisting of primary amines, secondary amines, diamines, alkali metal oxides, alkali metal hydroxides, alkaline earth metal salts, alkaline earth metal oxides, and alkaline earth metal hydroxides.

15. A method of treating a well penetrating an underground formation, which comprises contacting said formation with a well working composition comprising a fluid medium selected from the group consisting of water, oil, and an emulsion of water and oil, and asphaltene carboxylic acids, said asphaltene carboxylic acids prepared by reacting asphaltenes having molecular weights in the range of $10^3$ to $10^5$ with nitric acid.

16. A method of drilling a well with well drilling tools, which comprises circulating in said well a drilling fluid comprising a fluid medium selected from the group consisting of water, oil, and an emulsion of water and oil, and an additive selected from the group consisting of asphaltene carboxylic acids and the neutralized salts thereof in an amount sufficient to reduce the fluid loss of said composition, said asphaltene carboxylic acids prepared by reacting asphaltenes having molecular weights in the range of $10^3$ to $10^5$ with nitric acid, and said neutralized salts prepared by neutralizing the resulting asphaltene carboxylic acids with a basic neutralizing agent selected from the group consisting of primary amines, secondary amines, diamines, alkali metal oxides, alkali metal hydroxides, alkaline earth metal salts, alkaline earth metal oxides, and alkaline earth metal hydroxides.

17. A method of fracturing an underground formation penetrated by a well, which comprises fracturing said formation with a fracturing composition comprising a liquid medium comprising oil and an additive selected from the group consisting of asphaltene carboxylic acids and the neutralized salts thereof in an amount sufficient to reduce the fluid loss of said composition, said asphaltene carboxylic acids prepared by reacting asphaltenes having molecular weights in the range of $10^3$ to $10^5$ with nitric acid, and said neutralized salts prepared by neutralizing the resulting asphaltene carboxylic acids with a basic neutralizing agent selected from the group consisting of primary amines, secondary amines, diamines, alkali metal oxides, alkali metal hydroxides, alkaline earth metal salts, alkaline earth metal oxides, and alkaline earth metal hydroxides.

References Cited in the file of this patent

UNITED STATES PATENTS

| | | |
|---|---|---|
| 2,223,027 | Dawson et al. | Nov. 26, 1940 |
| 2,545,169 | Salathiel | Mar. 13, 1951 |
| 2,779,735 | Brown et al. | Jan. 29, 1957 |
| 2,785,198 | Grosskinsky et al. | Mar. 12, 1957 |
| 2,813,826 | Crowley et al. | Nov. 19, 1957 |
| 2,819,300 | Grosskinsky | Jan. 7, 1958 |
| 2,930,813 | Schenk et al. | Mar. 29, 1960 |